United States Patent [19]

Center et al.

[11] Patent Number: 5,402,007
[45] Date of Patent: Mar. 28, 1995

[54] METHOD AND APPARATUS FOR MAINTAINING VEHICLE BATTERY STATE-OF-CHANGE

[75] Inventors: Marc B. Center, Royal Oak; John A. Zahorchak, Warren; Alton G. De Claire, Jr., Troy, all of Mich.

[73] Assignee: General Motors Corporation, Detroit, Mich.

[21] Appl. No.: 145,539

[22] Filed: Nov. 4, 1993

[51] Int. Cl.⁶ .............................................. H02P 9/04
[52] U.S. Cl. .................................. 290/40 B; 123/339; 290/40 R; 290/40 A; 290/40 C; 320/61; 322/38
[58] Field of Search ................. 290/40 R, 40 A, 40 B, 290/40 C, 51; 123/339; 320/61; 322/38

[56] References Cited

U.S. PATENT DOCUMENTS

| | | | |
|---|---|---|---|
| 4,441,471 | 4/1984 | Kratt et al. | 123/339 |
| 4,467,761 | 8/1984 | Hasegawa | 123/339 |
| 4,491,108 | 1/1985 | Hasegawa et al. | 123/339 |
| 4,527,112 | 7/1985 | Herman | 290/40 R |
| 4,611,560 | 9/1986 | Miyazaki et al. | 123/339 |
| 4,649,878 | 3/1987 | Otobe et al. | 123/339 |
| 5,153,446 | 10/1992 | Shimomura | 290/40 C |

FOREIGN PATENT DOCUMENTS 136550  5/1990  Japan .

OTHER PUBLICATIONS

Yano & Yamamoto; Vehicle Electrical Power Systems—Present and Future, 1992; Convergence '92, pp. 313–318.

Guba; Management of Electrical Loads to Improve Fuel Economy—1993 Chrysler LH Vehicles; 1992 Convergence '92, pp. 309–312.

Primary Examiner—A. D. Pellinen
Assistant Examiner—Robert Lloyd Hoover
Attorney, Agent, or Firm—Vincent A. Cichosz

[57] ABSTRACT

In a vehicle having a voltage regulated electric alternator driven by an engine for supplying power to drive electrical loads and to charge a vehicle battery, a method of maintaining battery state-of-charge includes adaptively learning a system voltage set-point during a first mode of engine operation probabalistically resulting in an electrical system operative in set-point regulation. The method further determines from the adaptively learned system voltage set-point and a present system voltage during a second mode of engine operation that the electrical system is operative in auto-regulation. Idle speed is controlled in response to the regulation state of the electrical system to maintain the system in set-point regulation to ensure adequate battery charge or minimal battery discharge during the second mode of engine operation.

18 Claims, 3 Drawing Sheets

METHOD AND APPARATUS FOR MAINTAINING VEHICLE BATTERY STATE-OF-CHANGE

BACKGROUND OF THE INVENTION

This invention relates to a motor vehicle electrical system and more particularly to a battery state-of-charge maintenance method and system effective during periods of vehicle operation to maintain the battery state-of-charge in accordance with actual vehicle electrical system requirements.

A typical motor vehicle electrical system has a voltage regulated alternator drivingly connected to the vehicle engine to provide power for vehicle electrical loads such as lighting, instrumentation, climate controls and other power accessories during periods of vehicle operation. Ideally, sufficient generated electrical power remains available during all periods of vehicle operation to maintain the battery state-of-charge. However, it is well recognized that there are periods of vehicle operation during which battery state-of-charge is actually reduced due to net vehicle load power consumption exceeding that generated by the alternator.

These periods of operation wherein the battery experiences a reduced state-of-charge may be short in duration with insufficient high engine speed time or may simply be sustained low engine speed periods, both of which may result in a net electrical power draw from the battery. Battery discharge is exacerbated during such periods when the electrical load is relatively high such as is typically experienced during inclement weather when accessories such as rear defogger, heated windshield, heated seats, windshield wipers, headlights, etc. are active. It is also well known that cold temperature reduces the charge acceptance rate of a battery significantly, thereby requiring even longer periods of high engine speed operation. Additionally, a battery which is at least partially discharged and immediately recharged is characterized by a much greater rate of charge acceptance than an equivalently discharged battery which is allowed to sit for a period of 16 hours—a period of time which is roughly equivalent to what is known in the automotive field as an overnight cold soak representative of actual expected periods of overnight inactivity.

Automotive electrical loads continue to grow as customer demand for more creature comfort options such as heated seats, heated windshields, etc. continues to rise. Expansion of electronic controls on powertrain and suspension systems, evolution of navigation, intelligent highway and obstacle detection systems as well as numerous other unmentioned accessories clearly indicate increased demands for electric power in an automobile. Additionally, rising parasitic loads during periods of vehicle in operation make maintaining a high battery state-of-charge under all driving conditions very desirable.

It is well known that alternator output increases with increased engine rpm and most alternators can supply power needed to meet most electrical loads at high speeds. Low engine speed alternator rpm is limited by the drive pulley ratio which in turn is dictated by the maximum allowable alternator rpm at maximum engine speed. The demand for electrical power at idle is fast approaching or exceeds the supply available from the alternator.

Numerous attempts have been made at addressing the various hurdles associated with delivering sufficient electrical power especially at vehicle idle. Some gains have been made by adjusting alternator output in accordance with battery temperature in order to most efficiently recharge the battery. Demand-side electrical load management is incorporated in the design and development of motor vehicles and includes such things as pulse width modulation control of DC motors, exterior styling compromises to minimize bulb usage, alternative lighting schemes such as discharge type beam headlamps, central source lighting and LED brake lamps. Battery rundown protection systems also have been proposed which are intended to monitor parasitic loads and battery state-of-charge during periods of vehicle inoperative to disconnect the battery from vehicle electrical loads prior to the point at which the battery becomes too discharged to restart the vehicle.

SUMMARY OF THE INVENTION

One object of the present invention is to maintain a high level of battery state-of-charge especially under low idle and high electrical power load conditions.

Another object of the invention is to maintain the battery state-of-charge without an increase in size or mass of the alternator through redesign.

According to one aspect of the present invention, a vehicle engine drives an alternator for producing electric power for driving vehicle electrical loads and charging the vehicle battery. At sufficiently high alternator RPM, as may be deduced from conventional engine RPM data and known drive ratio between engine accessory drive and alternator, system voltage is measured to determine the system voltage set-point of the alternator voltage regulator. During continued operation of the vehicle, and particularly through periods of engine idle, system voltage is compared with the system voltage set-point. If the system voltage falls too far below the system voltage set-point, thereby indicating power requirements for vehicle electrical loads exceed the power capacity of the alternator at present engine idle speed, engine idle speed is increased to thereby increase the power capacity of the alternator. Where the system voltage is not below the system voltage set-point, thereby indicating power requirements for vehicle electrical loads do not exceed the power capacity of the alternator at present engine idle speed, engine idle speed is decreased to thereby decrease the power capacity of the alternator and use of fuel.

DETAILED DESCRIPTION OF THE DRAWINGS

A conventional electrical power system in a motor vehicle comprises a rechargeable electric battery 10, alternator 14, voltage regulator 12 and vehicle electrical load 18 as shown in FIG. 1. Alternator power output predominantly is a function of alternator RPM and field current, and an increase in either will cause an increase in power output within the physical limits of the alternator. Voltage regulation is typically accomplished by controlling the field current at a particular RPM. Voltage regulation is desirable to prevent system voltage from exceeding a predetermined level to prevent load damage and/or battery gassing during recharge and, just as importantly, to ensure that the system voltage does not fall below that required to maintain a fully charged battery.

It is well known that a battery, such as conventional lead acid used in automobiles, less readily accepts charge at lower temperatures thereby making it desirable to increase charging voltage at lower battery temperatures in order to restore energy thereto at an acceptable rate. Underhood temperature is known to bear a substantially predictable relationship to battery temperature and is thereby utilized by automotive electrical system designers as a measure thereof with appropriate calibration. Conventional voltage regulators are designed with underhood temperature dependance such that lower regulator temperature produces a higher regulated voltage set-point and vice-versa.

Figure 1A:
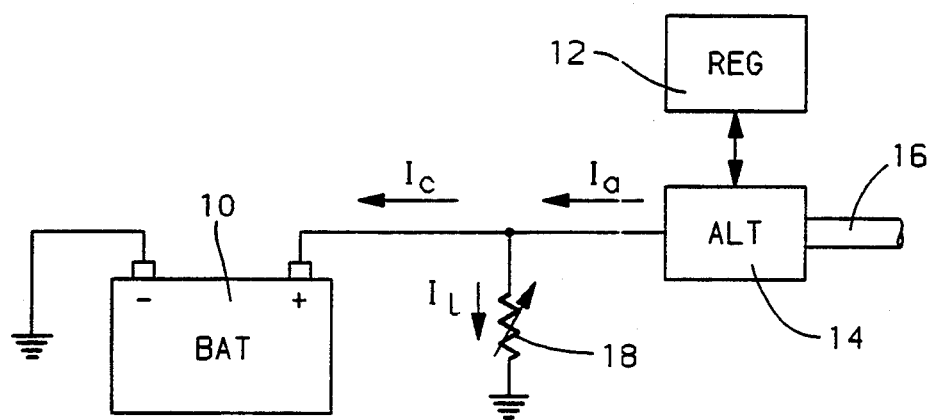
FIGS. 1a and 1b generally illustrate vehicle electrical system relationships.
Figure 1B:
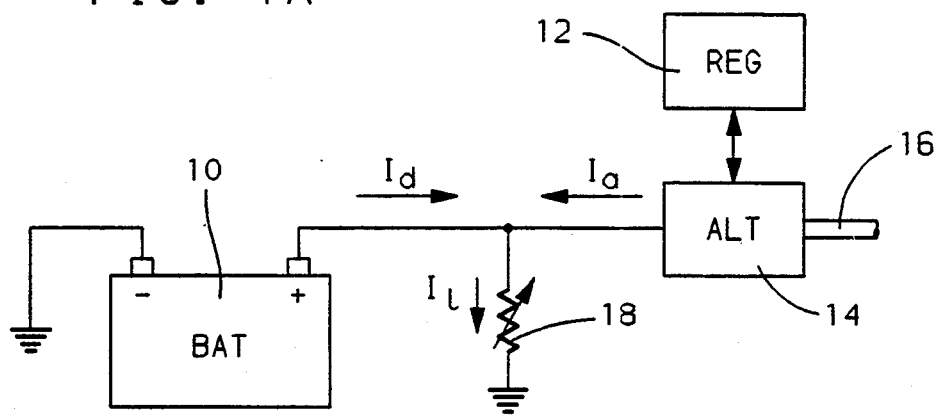

Referring to FIGS. 1a and 1b, two basic modes of vehicle electrical system operation are illustrated. Battery 10 is a conventional "12-volt" vehicle battery having a negative terminal to vehicle ground and a positive terminal at system voltage. Load 18 represents vehicle electrical loads between system voltage and vehicle ground. Alternator 14 is driven at input shaft 16 by an internal combustion engine (not shown). Voltage regulator 12 controls current through field windings of alternator 14 attempting to maintain a calibrated system voltage set-point. In practice, production vehicle electrical system alternator set-points may vary acceptably within a range of approximately one-half (0.5) volt. If the alternator power capacity is sufficient to drive active electrical loads 18 and restore energy to battery 10 (FIG. 1a), the regulator is operative in "set-point regulation" to control system voltage to the calibrated voltage set-point. If, however, the alternator power capacity is insufficient to drive the active electrical loads 18 (FIG. 1b), the regulator cannot maintain the calibrated voltage set-point even at maximum field current and system voltage is determined primarily by battery positive terminal voltage. This is termed "auto-regulation" and it is during these periods of operation that the battery experiences a net discharge.

Figure 2:
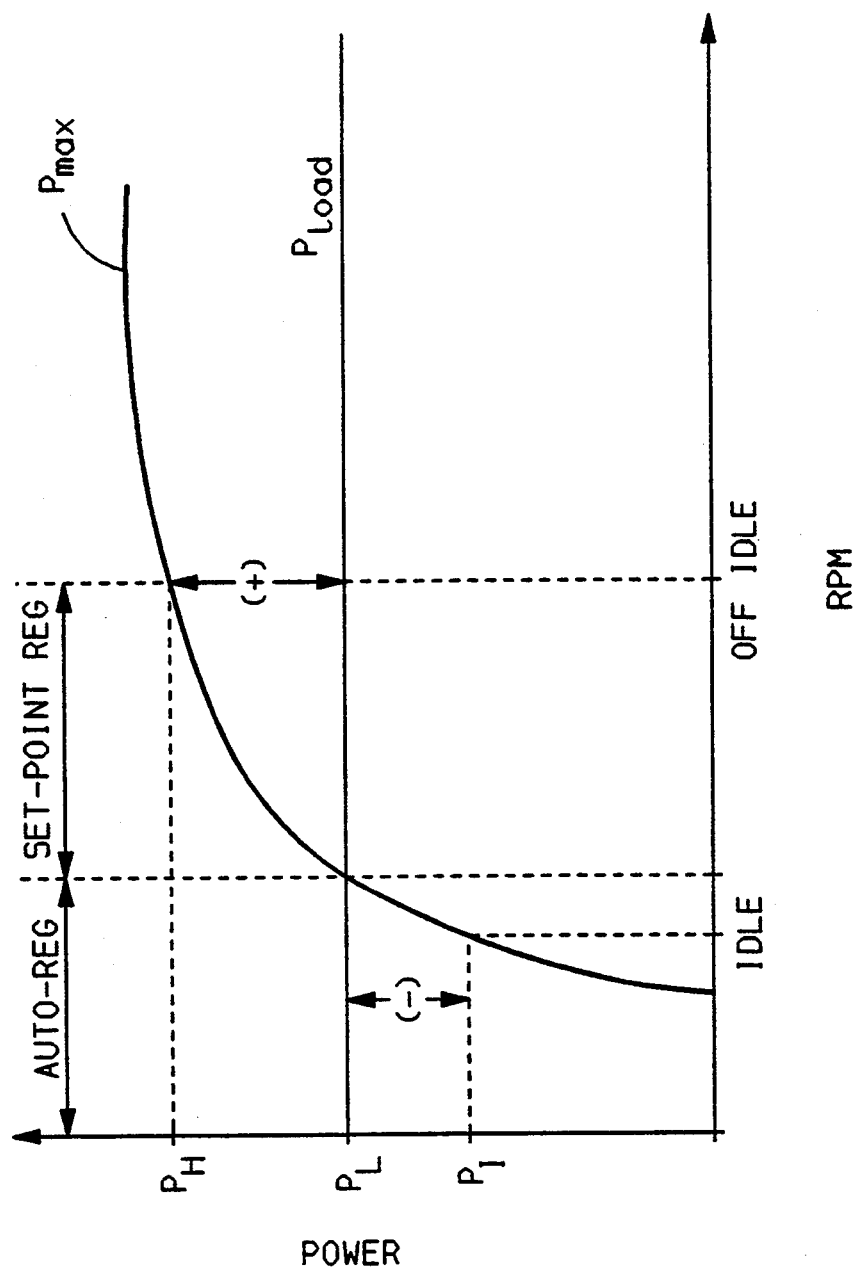
FIG. 2 illustrates a power capacity curve for an alternator and a typical vehicle electrical load.

FIG. 2 illustrates a vertical power axis and a horizontal RPM axis representing alternator RPM or engine RPM where the alternator rotates in proportion to the engine. Alternator power capacity curve ($P_{max}$) is plotted against the vertical POWER axis and horizontal RPM axis and represents an alternator maximum power production capacity throughout its operative range. Superimposed on the graph of FIG. 2 is a horizontal power consumption curve ($P_{load}$) representing a typical or average vehicle electrical load power consumption ($P_L$) at an acceptable operating system voltage.

Assuming an operating RPM to the left of the intersection of the $P_{max}$ and $P_{load}$ curves an alternator power deficit exists. For example, operation at IDLE produces maximum alternator power output of $P_I$ which indicates an alternator power deficit (−) equal to $P_I$−$P_L$. The alternator regulator attempts to maintain the calibrated system voltage set-point but cannot do so due to the power delivery limitations thereof. The alternator therefore operates in the region labeled "AUTO-REG" with maximum field current, the system voltage being determined by the battery. The alternator power deficit (−) is taken up by the battery resulting a net battery discharge as shown in FIG. 1b by discharge current $I_d$. Not uncommonly, the alternator operates in auto-regulation at relatively low RPM due to total active electrical loads demanding power in excess of the power capacity of the alternator.

Assuming an operating RPM to the right of the intersection $P_{max}$−$P_{load}$, an alternator power surplus may exist. For example, operation at OFF IDLE can produce maximum alternator power output of $P_H$ which indicates an alternator power surplus (+) equal to $P_H$−$P_L$. The alternator therefore operates in the region labeled "SET-POINT REG" with controlled field current, the system voltage being determined by the controlled field current. The battery may accept charge current $I_c$ in accordance with its state of charge and any alternator power surplus. When the battery is fully charged, it will not accept any further charge current at the regulated system voltage set-point and actual alternator power will substantially coincide with the power demand of the vehicle loads then active at the regulated system voltage set-point. Any alternator power surplus is therefore taken up by the battery resulting in battery recharge as shown in FIG. 1a by charge current $I_c$.

Figure 3:
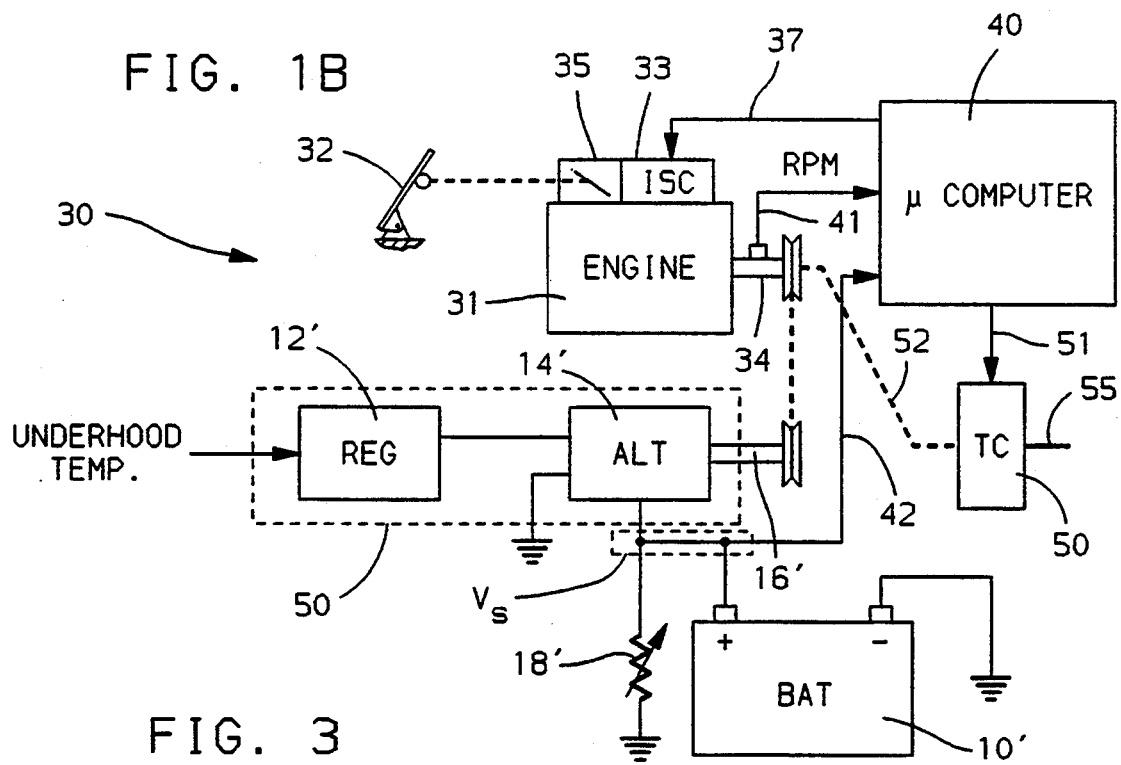
FIG. 3 shows a motor vehicle battery state-of-charge maintenance system in accordance with the present invention.

It is desirable for the aforementioned reasons outlined in the background section to maintain a vehicle battery at a high state of charge. FIG. 3 illustrates a preferred vehicle battery state-of-charge maintenance system 30 in accordance with the present invention. Internal combustion engine 31 is shown with throttle plate 35 coupled to accelerator pedal 32 for control of engine output shaft 34 rotational speed in accordance with operator demand. Operator actuation of accelerator pedal 32 defines a first mode of engine operation wherein engine speed is substantially determined by operator demand. Alternatively, in a vehicle equipped with cruise control for maintaining a vehicle cruising speed, cruise control activation may likewise define a first mode of engine operation consistent with operator demand.

Idle speed controller (ISC) 33 is also illustrated and responsive to a control signal on line 37 from conventional engine controller illustrated as microcomputer 40 in the figure. ISC may be of any well known types such as a throttle plate position control motor or alternatively a idle air bypass valve. Absent operator demand (accelerator control or cruise control setting), a second mode of engine operation is defined wherein engine speed is substantially determined by operation of ISC 33 in accordance with a control signal on line 37. ISC 33 maintains idle speed of the engine at a predetermined idle RPM according to well known vehicle parameters. Microcomputer 40 closed-loop controls fuel metering and various other engine functions in accordance with well known engine parameters and conventional techniques not illustrated nor described herein.

Alternator 14' is shown with input shaft 16' drivingly connected to output shaft 34 of engine 31. Conventionally an accessory drive belt and pulley arrangement are employed to transmit rotational force to the alternator from the engine at a fixed predetermined ratio, typically 1 to 3 (engine to alternator). Alternator 14' electrical output terminal is referenced to vehicle ground. Regulator 12' controls field current to alternator 14' in accordance with underhood temperature which provides a measure of battery temperature. Regulator 12' and alternator 14' are shown integrated as a unit by phantom box 50 as is often common practice in the art.

Battery 10' has a negative terminal tied to vehicle ground and a positive terminal coupled with alternator output terminal and one end of vehicle electrical load 18' to define system voltage node Vs. System voltage comprises an input to microcomputer 40 via line 42 as does RPM of engine output shaft 34 from speed sensor 41.

According to a preferred form of the invention, during closed-loop engine control, engine output shaft 34 RPM is monitored and is used as an adaptive system voltage set-point update flag. Once a predetermined threshold engine RPM indicative of substantially high alternator RPM is crossed and engine RPM is maintained above or within a predetermined range of the threshold for a predetermined time, recording of the present system voltage as the system voltage set-point is initiated. Since during off idle operation the alternator power capacity is typically a high percentage of its maximum power capacity, it can be assumed that the alternator is operative in the set-point regulation region as described in conjunction with FIG. 2 and the present system voltage can be used to reflect the present system voltage set-point. However, in the probabilistically rare instance where the alternator may be operative in the auto-regulation region even during off idle operation (e.g. all vehicle electrical accessories activated), it is desirable to check the magnitude of the present system voltage before proceeding with an update of the system voltage set-point, and defer any update where the present system voltage indicates that the system is operative in auto-regulation. The control of the invention iteratively re-learns the system voltage set-point as the vehicle continues to be operated.

Operator speed control of the engine as determined by operator throttle control via accelerator pedal or cruise control activation bypasses any further control steps of the present invention. Where engine speed is determined by ISC 33 the present system voltage is compared to the learned system voltage set-point. The magnitude and algebraic sign of the difference between system voltage and system voltage set-point is used to initiate periodic incremental changes to the idle speed within predetermined limits to control system voltage to system voltage set-point.

Of course, it is apparent that certain upper and lower idle speed limits are necessary, and one skilled in the art will take into account such factors as idle roughness, stall speed, fuel consumption, engine noise and vehicle creep torque associated with a fluid coupled engine/transmission arrangement as conventionally practiced by use of a torque converter between engine output and vehicle final drive. Referring back to FIG. 3, such a torque converter 50 is illustrated coupled to engine output shaft 34 via broken line 52. Output 55 from torque converter 50 is representative of conventional output to final drive and transmission gear elements not illustrated herein. Line 51 is a control line for controlling the torque coupling between the engine and final drive by any of a variety of well known methods. For example, U.S. Pat. Nos. 3,852,955 and 4,180,977 both assigned to the assignee of the present invention illustrate systems which either drain torque converter fluid to completely decouple engine torque output from the vehicle final drive or vary stator reaction elements to variably decouple engine torque from the vehicle final drive. Both of these references are herein incorporated in totality by reference, therefore the details thereof are not repeated herein.

Figure 4:
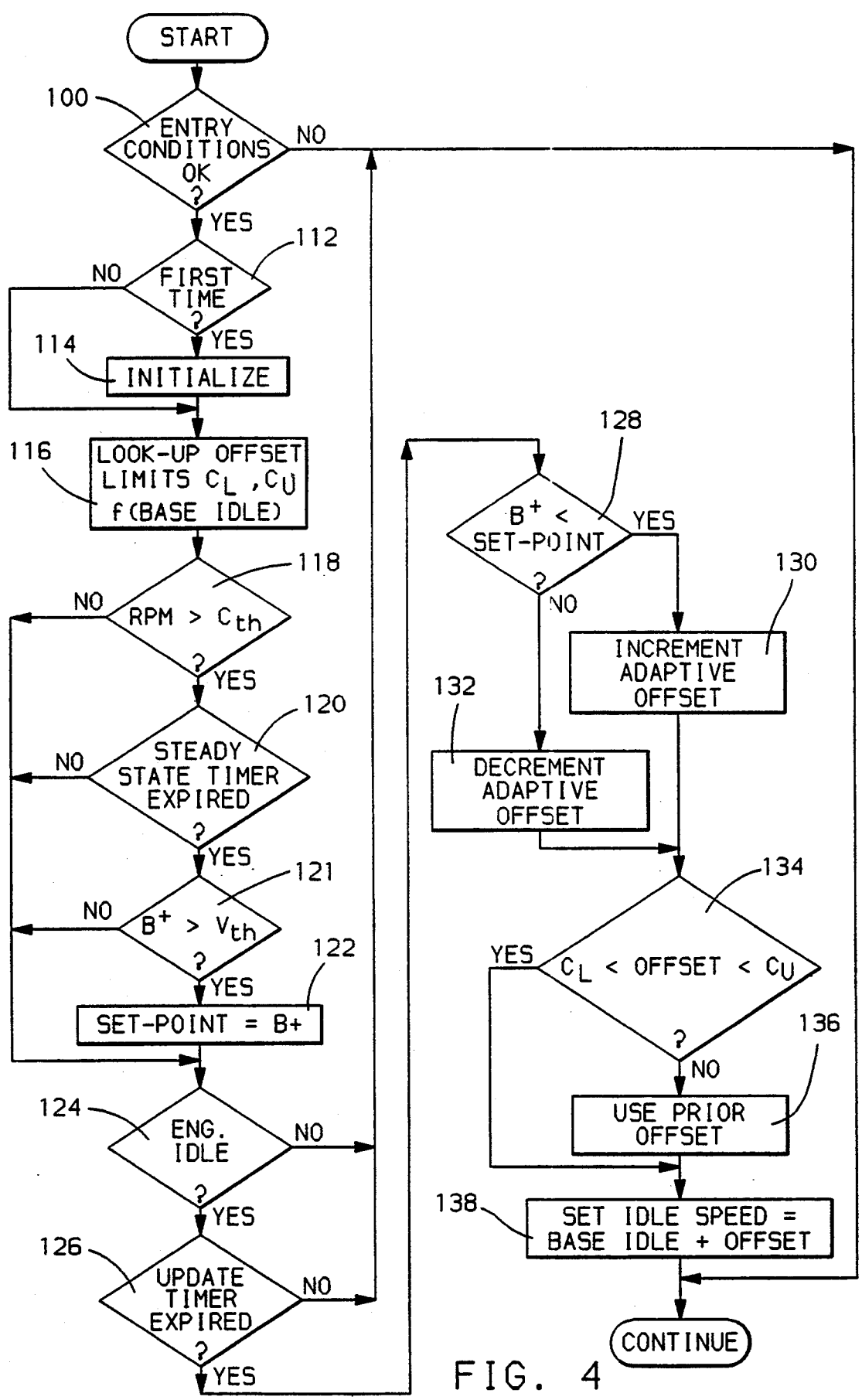
FIG. 4 illustrates a flow chart representative of computer control steps for execution by the microcomputer illustrated in FIG. 3 for carrying out the control of the present invention.

Referring now to FIG. 4, a flow chart representative of program steps executed by microcomputer 40 shown in FIG. 3 for establishing control in accordance with the invention is shown. Preferably, program steps corresponding to the flow chart are executed within the standard engine control loop for example at 100 millisecond intervals.

Decision block 100 is first encountered as a check of certain entry conditions. For example, block 100 in the present embodiment checks a predetermined engine temperature for indication of closed-loop engine control. Where the engine is not operative in closed-loop, processing bypasses the remainder of steps 102–138. If the engine is operative in closed-loop then steps 112 and 114 may initialize certain registers used for variables and timers in the remaining calculations and control. Step 116 reads values from a calibration table (ROM) for present upper and lower limits "$C_u$" and "$C_l$" respectively of a later determined idle speed offset "OFFSET". The limits are a function of a predetermined base idle "BASE IDLE" and additively therewith determine absolute limits on a lower and upper idle speed. Where, for example, a request for air conditioning is initiated it is common practice to boost BASE IDLE by a predetermined amount which, if the absolute upper and lower idle speed limits are to be maintained, necessitates different offset limits $C_u$ and $C_l$. Of course it will be apparent that the absolute upper and lower idle speed limits are within the discretion of the designer taking into account such factors as idle roughness, stall speed, fuel consumption, engine noise and vehicle creep torque where applied to a fluid coupled engine/transmission arrangement.

Steps 118–122 define the portion of control determining the adaptively learned system voltage set-point. Decision block 118 checks engine RPM against a predetermined RPM threshold "$C_{th}$". $C_{th}$ is a calibration value representative of a commonly attained engine RPM corresponding to a predetermined alternator RPM in accordance with the known drive ratio between the engine output shaft and alternator input shaft. Of course, alternator RPM could be determined directly at the expense of an additional rotation sensing transducer and circuitry and, for this reason, the commonly preexisting engine control parameter of engine RPM is preferably utilized. The RPM threshold $C_{th}$ is chosen corresponding to a relatively high alternator power capacity, for example greater than >90% of maximum alternator power capacity. After determination at decision block 120 that RPM has stabilized above the RPM threshold $C_{th}$ for a period sufficient to assume relatively stable regulator operation (two seconds in the present embodiment), decision block 121 is encountered. Block 121 checks if the system is operative in set-point regulation by comparing predetermined present system voltage "B+" with a voltage threshold "$V_{th}$". In the present embodiment, the threshold $V_{th}$ is set to 12.5 volts which conservatively would indicate that an alternator power deficit exists and the battery terminal voltage is determining system voltage. Where B+ exceeds the voltage threshold $V_{th}$, it is assumed that set-point regulation is operative and B+ is substantially representative of the system voltage set-point thereby passing control to step 122 whereat system voltage set-point is updated from the present system voltage B+. Where B+ does not exceed the threshold $V_{th}$, auto-regulation is assumed to be operative, B+ is substantially representative of battery voltage during discharge thereby not an accurate representation of system voltage set-point and the set-point update is bypassed. In summary, where the RPM, steady state or set-point regulation conditions are not satisfied respectively at 118, 120 and 121, no adaptive learn of system voltage set-point is performed and system voltage set-point remains equal to the previously learned system voltage set-point.

Processing continues from block 122 to decision block 124 which determines whether the operator is controlling engine speed or if the engine is operating in an idle mode. This can be accomplished by checking any one of various common engine control parameters such as throttle valve position or cruise control activation. If engine is in an idle mode of operation, control continues to decision block 126 to determine if a predetermined period of time has expired since the most recent idle speed adjustment. Step 126 in the present embodiment provides for a period of five seconds between any idle speed adjustments occasioned by the control of the present invention which has proven to be sufficient to provide acceptable rates of adjustments. If an update of idle speed is appropriate in time, control processing passes to the OFFSET determination steps 128–138. If, however, the engine speed is under operator control or the last OFFSET update is too proximal, OFFSET determination steps 128–138 are bypassed resulting in no change in any idle speed setting.

Proceeding with step 128, present system voltage B+ is compared to the adaptively learned system voltage set-point. When B+ is less than the system voltage set-point then it is assumed that the regulator is operative in auto-regulation and an idle speed increase may be desirable. Likewise, when B+ is greater than the system voltage set-point, an idle speed decrease may be desirable. Steps 130 and 132 represent increasing and decreasing idle speed OFFSET respectively by predetermined stepped amounts. Preferably, any increases or decreases in OFFSET are caused to occur hysteretically to avoid undesirable idle speed hunting. For example, increases and decreases in OFFSET will occur only if the magnitude of the difference between B+ and set-point exceeds a predetermined amount. The present embodiment utilizes an amount related to the voltage resolution of the controller. Additionally, it may be desirable to decrease OFFSET in stepped amounts of smaller magnitude relative the increase OFFSET stepped amounts to conservatively ensure sufficient time operation at higher idle speeds. OFFSET is next checked as shown at block 134 to determine if it falls within the upper and lower limits previously established in relation to the BASE IDLE. If OFFSET is outside the established limits then OFFSET is set to the previous OFFSET at 136. Otherwise, step 136 is bypassed and IDLE SPEED is set to summation of the present BASE IDLE and OFFSET amounts. IDLE SPEED is then utilized in a routine manner to closed-loop control engine RPM to the idle speed RPM value represented thereby.

According to a further embodiment of the present invention, upper and lower OFFSET limits $C_u$ and $C_l$ are influenced by torque decoupling or torque reduced coupling of the engine from the final drive in a fluid coupled automatic transmission equipped vehicle. As mentioned earlier with regard to calibrating OFFSET limits, creep torque and stall speed are among factors requiring consideration. Reducing or eliminating torque coupling of the engine to the final drive effectively reduces the creep torque which otherwise would increase with any increase in idle speed. Likewise, such a reduction or elimination of idle torque coupling may allow for lower idle stall speeds or at least reduced fuel consumption at equivalent idle speeds due to the reduced idle torque load on the decoupled engine. U.S. Pat. Nos. 3,852,955 and 4,180,977 both assigned to the assignee of the present invention are two exemplary fluid couplings which may be adapted for providing reduced torque coupling as described above. Therefore, the control of the present invention is readily adapted to additionally vary torque coupling of the engine to final drive thereby increasing at least the upper OFFSET limit $C_u$ to allow higher idle RPM and increased power generation by the alternator.

While the invention has been described in relation to certain preferred embodiments, those embodiments are intended only by way of example of possible practice of the invention within the full scope covered by the appended claims. Various modifications and alterations are expected to be apparent to those possessing ordinary skill in the appropriate arts encompassed by the present invention.

The embodiments of the invention in which an exclusive property or privilege is claimed are defined as follows:

1. In a motor vehicle having an internal combustion engine with closed-loop idle speed control mode, an electric battery, an alternator which is drivingly connected to rotate in proportion with the engine speed for supplying electrical power to vehicle electrical loads and for charging said battery, and a voltage regulator for establishing a regulated system voltage set-point, a method for maintaining battery state-of-charge by controlling idle speed comprising the steps:
   determining a first system voltage during a first mode of engine operation;
   determining a second system voltage during a second mode of engine operation;
   comparing said first and second system voltages and producing a control signal therefrom related to the difference therebetween; and
   varying said idle speed in accordance with said control signal.

2. In a motor vehicle having an internal combustion engine with closed-loop idle speed control mode, an electric battery, an alternator which is drivingly connected to rotate in proportion with the engine speed for supplying electrical power to vehicle electrical loads and for charging said battery, and a voltage regulator for establishing a regulated system voltage set-point, a method for maintaining battery state-of-charge at vehicle idle comprising the steps:
   periodically determining the regulated system voltage set-point;
   when the engine is operational in closed-loop idle speed control mode, determining the system voltage; and
   changing said idle speed by a predetermined idle speed offset when said regulated system voltage set-point and system voltage are not substantially equivalent.

3. The method for maintaining battery state-of-charge at vehicle idle as claimed in claim 2 wherein the step of periodically determining the regulated system voltage set-point occurs when the closed-loop idle speed control mode is inactive.

4. The method for maintaining battery state-of-charge at vehicle idle as claimed in claim 3 wherein the step of periodically determining the regulated system voltage set-point occurs when one of engine speed and alternator speed exceeds a predetermined speed.

5. The method for maintaining battery state-of-charge at vehicle idle as claimed in claim 2 wherein the step of periodically determining the regulated system voltage set-point includes updating a previously determined regulated system voltage set-point with a previously determined system voltage.

6. The method for maintaining battery state-of-charge at vehicle idle as claimed in claim 5 wherein updating the previously determined regulated system voltage set-point is inhibited if the previously determined system voltage does not exceed a predetermined threshold voltage.

7. The method for maintaining battery state-of-charge at vehicle idle as claimed in claim 2 wherein the step of changing said idle speed comprise changing said idle speed by a) a first predetermined idle speed offset when said regulated system voltage set-point exceeds said system voltage by a predetermined margin, and b) a second predetermined idle speed offset when said regulated system voltage set-point does not exceed said system voltage by said predetermined margin.

8. The method for maintaining battery state-of-charge at vehicle idle as claimed in claim 2 wherein said motor vehicle further includes means for variably coupling torque from the engine to a final drive means, the method further comprising the step of reducing the torque coupled from the engine to the final drive during periods of closed-loop idle speed control.

9. In a motor vehicle having an internal combustion engine with closed-loop idle speed control mode, an electric battery, an alternator which is drivingly connected to rotate in proportion with the engine speed for supplying electrical power to vehicle electrical loads and for charging said battery, and a voltage regulator for establishing a regulated system voltage set-point, a method for maintaining battery state-of-charge at vehicle idle comprising the steps:
when one of engine speed and alternator speed attains a predetermined threshold speed, determining the regulated system voltage set-point;
when the engine is operational in closed-loop idle speed control mode, determining the system voltage;
changing said idle speed by a) a first predetermined idle speed offset when said regulated system voltage set-point exceeds said system voltage by a predetermined margin, and b) a second predetermined idle speed offset when said regulated system voltage set-point does not exceed said system voltage by said predetermined margin.

10. The method for maintaining battery state-of-charge at vehicle idle as claimed in claim 9 wherein the step of determining the regulated system voltage set-point includes updating a previously determined regulated system voltage set-point with a previously determined system voltage.

11. The method for maintaining battery state-of-charge at vehicle idle as claimed in claim 10 wherein updating the previously determined regulated system voltage set-point is inhibited if the previously determined system voltage does not exceed a predetermined threshold.

12. The method for maintaining battery state-of-charge at vehicle idle as claimed in claim 9 wherein the step of changing said idle speed comprises cumulating an adaptive idle speed offset and summing said offset with a predetermined base idle speed.

13. The method for maintaining battery state-of-charge at vehicle idle as claimed in claim 9 further comprising the step of governing said idle speed to predetermined maximum and minimum idle speeds.

14. The method for maintaining battery state-of-charge at vehicle idle as claimed in claim 9 wherein the second predetermined idle speed offset is smaller in magnitude than the first predetermined idle speed offset.

15. In a motor vehicle having an internal combustion engine, an electric battery, an alternator which is drivingly connected to rotate in proportion with the engine speed for supplying electrical power to vehicle electrical loads and for charging said battery, and a voltage regulator for establishing a regulated system voltage set-point, an apparatus for maintaining battery state-of-charge by controlling idle speed comprising:
means for determining a first system voltage during a first mode of engine operation;
means for determining a second system voltage during a second mode of engine operation;
means for comparing said measured first and second system voltages and for producing a control signal in accordance with said comparison;
means responsive to said control signal for varying said idle speed in accordance therewith.

16. An apparatus for maintaining battery state-of-charge as claimed in claim 15 wherein:
said first mode of engine operation comprises an off idle mode of engine operation in excess of a predetermined RPM; and
said second mode of engine operation comprises an idle mode of engine operation.

17. An apparatus for maintaining battery state-of-charge as claimed in claim 15 wherein said means for varying said idle speed comprises idle air bypass means.

18. In a motor vehicle having an internal combustion engine, an electric battery, an alternator which is drivingly connected to rotate in proportion with the engine speed for supplying electrical power to vehicle electrical loads and for charging said battery, and a voltage regulator for establishing a regulated system voltage set-point, an apparatus for maintaining battery state-of-charge at vehicle idle comprising:
means for measuring a first system voltage during a first mode of engine operation wherein engine speed exceeds a predetermined threshold;
means for measuring a second system voltage during a second mode of engine operation wherein engine speed is within a predetermined idle speed range;
comparison means for comparing said measured first and second system voltages and for producing a control signal in accordance with said comparison;
engine idle speed control means responsive to said control signal and effective to increment and decrement said engine idle speed within said predetermined engine idle speed range.

* * * * *